(12) United States Patent
Prost et al.

(10) Patent No.: US 11,554,812 B2
(45) Date of Patent: Jan. 17, 2023

(54) AUTOMOBILE FRONT HINGE PILLAR STRUCTURE

(71) Applicants: PSA AUTOMOBILES SA, Poissy (FR); AUTOTECH ENGINEERING, Amorebieta-Etxano (ES)

(72) Inventors: Fabien Prost, Montbeliard (FR); Vincent Didier, Arcey (FR); Bruno Godoy, Dampierre les Bois (FR); Eric Alpy, Etupes (FR); Matthieu Barbier, Paris (FR); Matthieu Niess, Avallon (FR); Yoann Aurelien Rullaud, Besançon (FR); Mehdi Oulal, Vanves (FR)

(73) Assignees: PSA AUTOMOBILES SA, Poissy (FR); Autotech Engineering, Amorebieta-Etxano (ES)

( * ) Notice: Subject to any disclaimer, the term of this patent is extended or adjusted under 35 U.S.C. 154(b) by 59 days.

(21) Appl. No.: 17/264,666

(22) PCT Filed: Jul. 31, 2019

(86) PCT No.: PCT/FR2019/000123
§ 371 (c)(1),
(2) Date: Jan. 29, 2021

(87) PCT Pub. No.: WO2020/025863
PCT Pub. Date: Feb. 6, 2020

(65) Prior Publication Data
US 2021/0331745 A1   Oct. 28, 2021

(30) Foreign Application Priority Data

Aug. 1, 2018   (FR) ...................... 1857189

(51) Int. Cl.
*B62D 25/04* (2006.01)
*B62D 25/08* (2006.01)
*B62D 21/15* (2006.01)

(52) U.S. Cl.
CPC ........... *B62D 25/04* (2013.01); *B62D 21/152* (2013.01); *B62D 25/08* (2013.01)

(58) Field of Classification Search
CPC ........ B62D 25/04; B62D 25/02; B62D 25/08; B62D 21/152
(Continued)

(56) References Cited

U.S. PATENT DOCUMENTS

| 1,143,635 A | * | 6/1915 | Ledwinka | .............. | B62D 23/00 |
| | | | | | 296/203.01 |
| 8,646,302 B2 | | 2/2014 | Lety et al. | | |
| 2005/0046237 A1 | | 3/2005 | Miyoshi et al. | | |

FOREIGN PATENT DOCUMENTS

| EP | 2080689 A2 | 7/2009 |
| FR | 2800698 A1 | 5/2001 |

(Continued)

OTHER PUBLICATIONS

International Search Report for PCT/FR2019/000123 dated Jan. 13, 2020.

*Primary Examiner* — Dennis H Pedder
(74) *Attorney, Agent, or Firm* — Sandberg Phoenix & von Gontard PC

(57) ABSTRACT

The invention relates to a front hinge pillar (9) of a vehicle, consisting of a stamped part comprising a central body (11) that is intended to extend vertically, so as to exhibit a lower end (13) and an upper end (15) and lateral edges, the front hinge pillar (9) being characterized in that it further comprises a front extension (17) extending from one of said lateral edges of said central body (11) such that said central (Continued)

body (11) and said front extension (17) form a single part. The invention also relates to the methods for producing such a front hinge pillar (9).

14 Claims, 1 Drawing Sheet

(58) Field of Classification Search
USPC .............. 296/203.01, 203.02, 187.09, 187.1, 296/193.06
See application file for complete search history.

(56) References Cited

FOREIGN PATENT DOCUMENTS

| FR | 2926056 A1 | 7/2009 |
|----|------------|--------|
| FR | 2926280 A1 | 7/2009 |
| FR | 2927828 A1 | 8/2009 |
| JP | 2997739 B2 * | 1/2000 |
| WO | 2014154962 A1 | 2/2014 |
| WO | 2016132025 A1 | 8/2016 |

* cited by examiner

AUTOMOBILE FRONT HINGE PILLAR STRUCTURE

CROSS-REFERENCE TO RELATED APPLICATIONS

This application is the US National Stage under 35 USC § 371 of International Application No. PCT/FR2019/000123, filed 31 Jul. 2019 which claims priority to French Application No. 1857189 filed 1 Aug. 2018, both of which are incorporated herein by reference.

BACKGROUND

The present invention relates to the field of vehicles and, in particular, of motor vehicles. The invention relates, in particular, to a front hinge pillar structure of a vehicle, a vehicle comprising such a structure, and a method for manufacturing such a front hinge pillar structure.

Generally, the front and rear hinge pillars of a vehicle are uprights located toward the front or rear on the side of the body between a wheel arch and a door opening. The hinge pillars have different geometries specific to their location at the front or rear of the vehicle.

A front hinge pillar can be composed of a plurality of structural parts that are assembled together by welding or riveting. FIG. 1 comprises an arrangement of parts that are welded together so as to form a front hinge pillar 1. The various parts assembled in this way comprise a front reinforcing hinge pillar 3, an upper gusset 5 of the front hinge pillar, and a front reinforcement 7 on the passenger compartment side.

During a frontal impact, the resulting forces are transmitted to the structure of the vehicle through the side members and through the bay uprights, forming two force paths. A third force path comprises the front reinforcement 7 on the passenger compartment side, arranged on each side of the vehicle at the level of the wheel arch so as to transmit the forces received to the side members and to the bay uprights via the upper gussets 5 of the front hinge pillar and front hinge pillar reinforcements 3.

In particular, in the event of a frontal impact with a little overlap of the front of the vehicle, known as a "small-overlap" impact, the lateral portion of the front structure of the vehicle is highly stressed. This type of impact corresponds to a situation in which an impactor pushes down the front of the vehicle while only coming into contact with a portion of the front face of the vehicle comprising the lateral edge of the front face. This type of impact corresponds, for example, to a frontal impact between two vehicles that are offset from one another. In this type of impact, it is the front reinforcement on the passenger compartment side opposite the impactor that will primarily come into play. If the mechanical strength of this reinforcement is not sufficient, the reinforcement will deform excessively during this type of impact until the impactor is allowed to push against the wheel, which itself will load the front hinge pillar and cause it to move toward the rear of the vehicle. In addition, if the front hinge pillar does not have sufficient strength, it may also move back under the stress transmitted by the front reinforcement during the impact. The risks of intrusion into the passenger compartment are then substantial. It is useful to have a balance between the mechanical strength of the reinforcement and of the front hinge pillar in order to ensure the deformation of both the front of the vehicle and of the reinforcement, thus allowing for absorption of energy during the impact while limiting intrusions into the passenger compartment.

One known problem resulting from the assembly of these different parts is a sealing problem that it would be beneficial to be able to solve. In addition, the automotive industry is constantly looking for solutions to reduce the manufacturing costs of vehicles and to reduce their mass. Finally, there is a constant concern for improving mechanical performance and impact resistance. This is why several other types of front hinge pillar structures have already been proposed.

French Pat. No. FR2926056 proposes a reinforced front hinge pillar for a vehicle comprising an upper part, or gusset, and a lower part, or front hinge pillar reinforcement. The front hinge pillar reinforcement is made of a single part with different stampings, making it possible to stiffen it in order to improve its performance in terms of limiting the rotation of the front hinge pillar in the event of a frontal impact.

French Pat. No. FR2800698 proposes a front hinge pillar structure that combines the front hinge pillar reinforcement and the upper front hinge pillar gusset in a single part. The resulting part extends substantially vertically and comprises beam end supports for connection to the side member, to the bay upright, and to the front reinforcement on the passenger compartment side. The part is preferably made from a single casting of light metal, particularly aluminum or an alloy of light metals, particularly an aluminum alloy.

European Pat. No. EP2080689 describes a lateral reinforcement device that is intended to equip a front unit of a motor vehicle. The device comprises an elongated reinforcing element that is intended to be fixed to the body structure of the vehicle at the level of a side wall of the front unit, extending, in the longitudinal direction of the vehicle, between a front hinge pillar upright of the vehicle adjacent to the side wall and a front end of the front unit, with the longitudinal axis of the reinforcing element being oriented substantially parallel to the longitudinal direction.

SUMMARY

It is an object of the invention to address the drawbacks and concerns encountered in the prior art by proposing a new front hinge pillar structure that provides a tighter seal. It is also the object of the invention to provide a new front hinge pillar structure that is lighter. It is an object of the invention to improve the performance of the vehicle in the event of a frontal impact with low overlap (i.e., of the "small overlap" type). Finally, it is the object of the invention to propose a method for manufacturing such a structure that is more economical.

To this end, and according to a first aspect, a front hinge pillar of a vehicle comprised of a stamped part comprising a central body defining a lower end, an upper end, and lateral edges. The front hinge pillar further comprises a front extension that extends from one of the lateral edges of the central body so that the central body and the extension form a single part.

As will be understood from above description, the front hinge pillar is remarkable in that it proposes a joining-together of three structural parts, namely the upper front hinge pillar gusset, the front hinge pillar reinforcement, and the front reinforcement on the passenger compartment side into one. In doing so, the front hinge pillar addresses the sealing problems encountered in the prior art. The construction of the front hinge pillar also makes it possible to lighten the overall weight of the vehicle. Finally, the construction of the front hinge pillar will simplify the vehicle assembly process, since it is no longer necessary to assemble these different parts, which reduces overall production costs.

According to one preferred embodiment, the central body of the front hinge pillar comprises at its lower end a zone for attachment to a side member and/or at its upper end a zone for attachment to a bay upright. The central body assumes the functions of a front hinge pillar reinforcement and an upper front hinge pillar gusset.

Advantageously, the front extension:
- extends from one of the lateral edges of the central body in a substantially horizontal direction; and/or
- extends from one of the lateral edges of the central body at a height between the lower and upper ends of the central body; and/or
- forms with the central body an arcuate shape that is intended to form a wheel arch; preferably, the angle α at the center intercepting the circular arc is greater than or equal to 45°.

According to a preferred embodiment, the central body and/or the front extension comprise at least one reinforcing rib; preferably, the front extension comprises at least one reinforcing rib that is arranged so as to extend horizontally.

According to one aspect, the front hinge pillar is made of ultra-high elastic limit steel having, after hot stamping, a mechanical strength Rm of at least 1200 MPa as measured according to ISO standard 6892-1:2016 and an elongation at break of at least 3% as measured according to ISO standard 6892-1:2016.

In a variant, the central body of the front hinge pillar has a mechanical strength that is greater than the mechanical strength exhibited by its front extension; preferably, the central body has a mechanical strength Rm of at least 1200 MPa and the front extension has a mechanical strength Rm of between 300 and 1150 MPa, the mechanical strength being measured according to ISO standard 6892-1:2016.

Alternatively, the thickness of the central body is greater than that of the front extension. That is, the thickness of the part forming the central body is greater than the thickness of the part forming the extension.

According to a second aspect, an assembly comprises a front hinge pillar as defined according to the first aspect, and a reinforcing part that is configured to be superimposed at least partially at the upper end of the central body and at the front extension. The reinforcement part is joined to the hinge pillar by welding.

According to a third aspect, a reinforcing part of the front hinge pillar is remarkable in that it comprises a hot-stamped steel part that is configured to exhibit, at least in part, a shape that is complementary to the upper end of the central body and to the front extension of a front hinge pillar according to the first aspect so as to be able to be superimposed thereon. Preferably, the reinforcing part is made of a steel having, after hot stamping, a mechanical strength Rm of between 400 and 1100 MPa, the mechanical strength being measured according to ISO standard 6892-1:2016.

According to a fourth aspect, a vehicle comprises at least one front hinge pillar as defined according to the first aspect or an assembly according to the second aspect.

According to a fifth aspect a method is disclosed for manufacturing a front hinge pillar according to the first aspect, the central body of the front hinge pillar having a mechanical strength that is greater than the mechanical strength exhibited by its front extension, the method being remarkable in that it comprises a differential hardening operation, the method comprising at least:
- a step of heating a steel blank to a temperature above which the structure of the steel becomes austenitic;
- a step of hot stamping the heated blank in a stamping tool having at least two zones; and
- a step of differential quenching of the different zones, such that at least one zone of the stamping tool is cooled at a cooling rate greater than the cooling rate applied to another zone.

Preferably, the differential quenching operation comprises, during the stamping step, an additional step of heating a portion of the stamped blank in at least one zone, so that at the time of the hardening step at least one zone of the stamping tool is brought to a temperature higher than the temperature exhibited by another zone of the tool.

According to a sixth aspect, a method is disclosed for manufacturing a front hinge pillar according to the first aspect, the central body of the front hinge pillar having a mechanical strength that is greater than the mechanical strength exhibited by its front extension, the method comprising a laser splicing operation comprising:
- a step of laser-welding at least two sheet elements that are arranged adjacent each other so as to form a sheet blank comprising at least two portions exhibiting mechanical characteristics different from one another, and
- a step of hot-stamping such a blank so as to form a front hinge pillar comprising a central body and an extension exhibiting mechanical characteristics that are different from one another.

DESCRIPTION OF THE FIGURES

The invention will be well understood and other aspects and advantages will emerge clearly on reading the following description, which is provided for the sake of example and with reference to the attached drawing sheet, according to which.

DETAILED DESCRIPTION

In the following description, the term "comprise" is synonymous with "include" and is not limiting, in that it allows the presence of other elements in the structure, the vehicle, or the front hinge pillar reinforcement part to which it refers. It will readily be understood that the term "comprise" includes the terms "consist of." In the various figures, the same references designate identical or similar elements. The terms "lower," "upper," "front," "rear" will be understood in relation to the general orientation of the vehicle. The term "lower" will indicate a greater proximity to the ground in the vertical direction than the term "upper." The term "front" will indicate a positioning oriented toward the front of a vehicle in the horizontal direction, and the term "rear" will indicate a positioning oriented toward the rear of a vehicle in the same direction. The term "horizontal portion" will define a portion of a vehicle part that extends between a front end and a rear end of the part. The unit of measurement MPa corresponds to "Mega Pascals."

Figure 1:
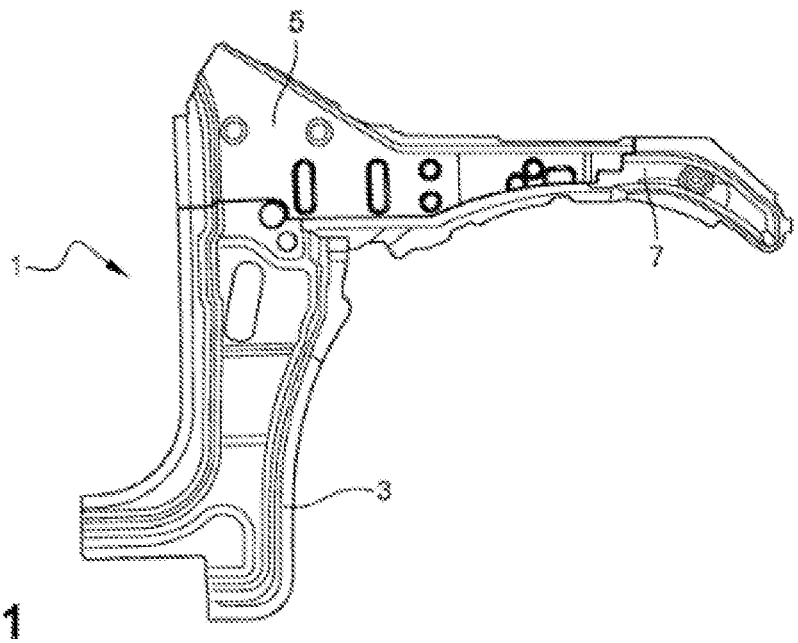
FIG. 1 shows an assembly forming a front hinge pillar structure according to the prior art.
Figure 2:
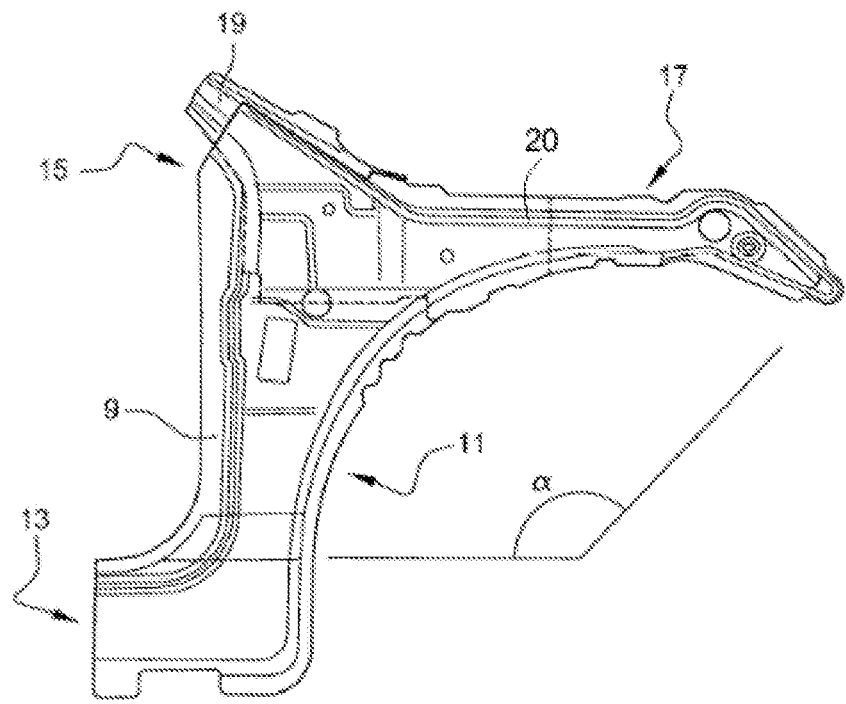
FIG. 2 shows an assembly forming a front hinge pillar structure.

Since FIG. 1 was commented on in the introductory part, we will now refer to FIG. 2.

A front hinge pillar 9 of a vehicle comprises a stamped part comprising a central body 11 that is intended to extend vertically when mounted in the vehicle so as to define a lower end 13 and an upper end 15 and lateral edges, the front hinge pillar 9 being remarkable in that it further comprises a front extension 17 that extends from one of the lateral edges of the central body 11, so that the central body 11 and the front extension 17 form one part.

According to a preferred embodiment, the central body 11 comprises at its lower end 13 a zone for attachment to a side member and at its upper end 15 a zone for attachment to a bay upright. The central body 11 thus assumes the functions of the front hinge pillar reinforcement parts and of the upper front hinge pillar gusset of the prior art. The fixing areas of the side members or the bay uprights comprise at least one wall and/or at least one bearing flange against which at least part of a wall of a side member or a bay upright comes into contact.

The front extension 17 of the front hinge pillar 9 assumes the function of the front reinforcement on the passenger compartment side of the prior art. As such, the front extension 17 extends from one of the lateral edges of the central body 11 in a substantially horizontal direction toward the front of the vehicle in which the front hinge pillar 9 is intended to be mounted, and/or at a height between the lower end 13 and upper end 15 of the central body 11. The front hinge pillar 9 has the general shape of a cross with three branches, each branch taking up a force path in the event of a frontal impact. Preferably, one of the branches-namely, the front extension 17—has an arched profile.

According to an advantageous configuration, the front extension 17 forms with the central body 11, and partly with its lower part, a circular arc shape that is intended to form a wheel arch. Preferably, the angle α at the center intercepting the circular arc is greater than or equal to 45°; preferably, the angle α is greater than or equal to 50°; more preferably, the angle α is greater than or equal to 55°; and more preferably still, the angle α is greater than or equal to 60°. This configuration is particularly advantageous for the impact resistance with low overlap of the "small overlap" type. After all, in the prior art, the assembly of different parts did not make it possible to obtain a satisfactory connection between the rabbets at the level of the wheel arch. It can be seen in FIG. 1 that the curve delimiting the wheel arch is interrupted at the junction between the front pillar reinforcement 3 and the front reinforcement 7 on the passenger compartment side. This step 10 is detrimental to the impact resistance due to a wedge effect that reduces the strength of the assembly. The fact of having only one part as in the front hinge pillar of FIG. 2 allows for better management of the geometry of the part and an improvement in performance in terms of managing small-overlap impacts.

According to a preferred embodiment, the central body 11 and/or the front extension 17 comprise at least one reinforcing rib 20. Preferably, the front extension 17 comprises at least one reinforcing rib that is arranged to extend horizontally. The presence of one or more reinforcing ribs makes it possible to stiffen the front hinge pillar 9.

According to a first aspect of the front hinge pillar, the front hinge pillar 9 can be homogeneous in terms of the mechanical characteristics that it has. Those skilled in the art will then have an advantage in using for the manufacture thereof a steel with an ultra-high elastic limit having a mechanical strength Rm of at least 1200 MPa as measured according to ISO standard 6892-1:2016 and an elongation at break of at least 3% as measured according to ISO standard 6892-1:2016. Steels with such characteristics are available on the market, being sold, for example, by ArcelorMittal under the trade name Usibor® 1500 or 22MnB5; in fact, after a hot stamping operation, these steel grades have an elastic limit Re of 1100 MPa, a mechanical strength Rm of 1500 MPa, and an elongation at break of A≥6%.

According to another aspect of the front hinge pillar 9, the central body 11 and the front extension 17 have different mechanical characteristics. In particular, the central body 11 of the front hinge pillar 9 has a mechanical strength that is greater than the mechanical strength exhibited by its front extension 17. Thus, the central body 11 ideally has a mechanical strength Rm of at least 1200 MPa, whereas the front extension 17 has a mechanical strength Rm of between 300 and 1150 MPa, the mechanical strength being measured according to ISO standard 6892-1:2016. Preferably, the mechanical strength Rm exhibited by the central body 11 is at least 1300 MPa, more preferably at least 1400 MPa, and even more preferably at least 1500 MPa. Preferably, the front extension 17 has a mechanical strength of between 350 and 1100 MPa, preferably between 400 and 1000 MPa, more preferably between 400 and 900 MPa, and more preferably still between 450 and 800 MPa.

The steels that can be used in the field of the hot-stamping of motor vehicle structural parts can be classified according to their mechanical characteristics and, in particular, by their mechanical strength characteristic Rm as measured according to ISO standard 6892-1:2016 as well as by their elastic properties as indicated by their elongation at break A or by their elasticity limit Re, also measured according to ISO standard 6892-1:2016.

When a steel is deformed, this deformation is reversible and proportional to the load as long as one remains in the elastic deformation range of the steel. When the load becomes too great, one enters the range of plastic deformation in which the deformations undergone by the steel are irreversible. The elastic limit Re of a steel is the stress (unit load) delimiting the plastic and elastic ranges. When a force is exerted on a steel beyond its elastic limit, the resulting deformation is therefore irreversible. The tensile strength or mechanical strength Rm represents the maximum allowable stress of a steel. When a force is exerted on a steel beyond its limit of mechanical strength, breaking occurs. The elongation at break A represents the maximum allowable relative deformation of a steel before breaking.

A distinction is thus made between mild steels exhibiting an elastic limit ranging from 300 to 350 MPa, steels with high elastic limit (HLE) exhibiting an elastic limit ranging from 400 to 700 MPa, steels with very high elastic limit (VHLE) exhibiting a yield strength ranging from 800 to 1000 MPa, and ultra-high yield strength steels (UHLE) exhibiting a yield strength of 1100 to 1500 MPa.

Also, when it has homogeneous mechanical properties, the front hinge pillar 9 will preferably be made of an ultra-high elastic limit steel. When it has zones with different mechanical properties, the front hinge pillar 9 will preferably comprise a central body 11 made of steel with a very high elastic limit and a front extension 17 made of steel with a high elastic limit.

In a variant, when the front hinge pillar 9 has homogeneous mechanical properties, it can be made of a steel having a lower mechanical strength than a steel with an ultra-high elastic limit, such as, for example, a steel with a very high elastic limit or high elastic limit, in which case the thicknesses are selected so as to obtain the desired mechanical strength of the different parts of the front hinge pillar.

According to a preferred embodiment, when the front hinge pillar comprises portions exhibiting different mechanical characteristics, the front hinge pillar 9 can be formed by hot stamping with differential cooling. One example of a hot stamping tool with differential cooling is described in French Pat. No. FR2927828. The manufacturing method comprises a differential hardening operation comprising at least:
- a step of heating a steel blank to a temperature above which the structure of the steel becomes austenitic;
- a step of stamping the heated blank in a stamping tool having at least two zones;
- a step of differential quenching of the different zones, such that at least one zone of the stamping tool is cooled at a cooling rate greater than the cooling rate applied to another zone.

According to a known principle, the higher the cooling rate of a steel part, the higher the final mechanical strength of the part. Also, according to the method, the central body 11 of the front hinge pillar 9 will be cooled at a higher quenching speed than that used for cooling the front extension 17.

Preferably, the differential quenching operation comprises, during the stamping step, an additional step of heating a portion of the stamped blank in at least one zone, so that, at the time of the hardening step, at least one zone of the stamping tool is brought to a temperature higher than the temperature exhibited by another zone of the tool. The tool then comprises a so-called hot zone and a so-called cold zone. The portion or portions of the front hinge pillar 9 arranged in the so-called hot zone will have a lower mechanical strength than the portion or portions of the front hinge pillar 9 arranged in the so-called cold zone. Also, according to the method, the central body 11 of the front hinge pillar 9 will be formed in a so-called cold zone of the stamping tool, whereas its front extension 17 will be formed in a so-called hot zone of the tool.

The selection of heating temperatures and cooling rates will be easily adapted by those skilled in the art according to the initial characteristics of the steel used and the desired final characteristics.

According to another preferred embodiment of the front hinge pillar, when the front hinge pillar comprises portions exhibiting different mechanical characteristics, the front hinge pillar 9 can be formed by laser splicing. Laser splicing is a technique known to those skilled in the art which comprises placing two or more blanks against each other which are welded together by laser welding so as to form a sheet blank comprising at least two adjacent parts exhibiting different mechanical and elastic characteristics. The blank obtained by laser splicing is then hot-stamped in a single tool so as to obtain a part exhibiting different mechanical characteristics in different places. In the event that the front hinge pillar has non-homogeneous mechanical characteristics, different mechanical characteristics for the central body 11 and the front extension 17 can be obtained by using for the central body 11 and the front extension 17 sheet metal blanks of different thickness and/or sheet blanks that are made with steels of different grades. For example, the central body 11 can be made with an ultra-high yield strength steel sheet blank and the extension 17 with a high yield strength steel sheet blank, or the central body 11 can be made with a sheet blank of greater thickness than the sheet blank used for the extension 17. A combination of sheet thicknesses and different sheet grades can also be considered. Those skilled in the art will know how to choose the thicknesses and/or grades of steel in order to obtain the desired mechanical characteristics of the different parts forming the front hinge pillar.

According to a preferred embodiment the front hinge pillar 9 is reinforced as necessary by a reinforcing part 19. This reinforcing part 19 is a hot-stamped steel part that is configured to exhibit, at least in part, a shape that is complementary to the upper end 15 of the central body 11 and to the front extension 17 of a front hinge pillar so as to be able to superimpose it. Optionally, the reinforcing part comprises at least one stiffening rib (not shown). Preferably, the reinforcing part 9 is made of a steel having, after hot stamping, a mechanical strength Rm of between 400 and 1100 MPa, the mechanical strength being measured according to ISO standard 6892-1:2016. The reinforcing part 19 is joined to the front hinge pillar 9 by welding. The weld points are arranged both on the bottom of the part and on the rabbets.

The invention claimed is:

1. A method for manufacturing a front hinge pillar of a vehicle, the front hinge pillar comprising a stamped part comprising a central body that extends generally vertically so as to define a lower end, an upper end and lateral edges, the front hinge pillar further comprising a front extension that extends from one of said lateral edges of said central body so that said central body and said front extension form a single part,
the central body of said front hinge pillar having a mechanical strength that is greater than a mechanical strength of said front extension, the method comprising a differential hardening operation, the differential hardening operation comprising at least:
a step of heating a steel blank to a temperature above which the steel becomes austenitic;
a step of hot stamping the heated blank in a stamping tool having at least two zones; and
a step of differential quenching of the at least two zones, such that at least one of said zones of the stamping tool is cooled at a cooling rate greater than the cooling rate applied to another of said zones.

2. The method according to claim 1, wherein the central body of said front hinge pillar comprises at its lower end a zone for attachment to a side member and/or at its upper end a zone for attachment to a bay upright.

3. The method according to claim 1, wherein the central body and/or the front extension of said front hinge pillar comprise at least one reinforcing rib.

4. The method according to claim 3, wherein the front extension comprises at least one reinforcing rib that is arranged so as to extend horizontally.

5. The method according to claim 1:
wherein said front hinge pillar is made of ultra-high elastic limit steel having, after hot stamping, a mechanical strength Rm of at least 1200 MPa as measured according to ISO standard 6892-1:2016 and an elongation at break of at least 3% as measured according to ISO standard 6892-1:2016; or
wherein the central body of said front hinge pillar has a mechanical strength that is greater than the mechanical strength exhibited by its front extension.

6. The method according to claim 1, wherein a thickness of the central body of said front hinge pillar is greater than that of the front extension.

7. The method according to claim 1, wherein said front hinge pillar further comprises a reinforcing part that is configured to be superimposed at least partially on the upper end of said central body and on said front extension.

8. The method according to claim 7, wherein said reinforcing part is composed of a part made of hot-stamped steel and made of a steel having, after hot stamping, a mechanical strength Rm of between 400 and 1100 MPa, the mechanical strength being measured according to ISO standard 6892-1:2016.

9. The method according to claim 1 wherein said front hinge pillar is part of a vehicle.

10. A method for manufacturing a front hinge pillar of a vehicle, said front hinge pillar comprising a stamped part comprising a central body that extends generally vertically so as to define a lower end, an upper end and lateral edges, the front hinge pillar further comprising a front extension that extends from one of said lateral edges of said central body so that said central body and said front extension form a single part, wherein said front extension:
- extends from said one of said lateral edges of said central body in a substantially horizontal direction, and/or
- extends from said one of said lateral edges of said central body at a height between the lower and upper ends of the central body, and/or
- forms with the central body an arcuate shape that is adapted to form a wheel arch, the central body of said front hinge pillar having a mechanical strength that is greater than the mechanical strength exhibited by said front extension, the method comprising a laser splicing operation, the laser splicing operation comprising:
- a step of laser-welding at least two sheet elements that are arranged adjacent each other so as to form a sheet blank comprising at least two portions having different mechanical characteristics, and
- a step of hot-stamping said sheet blank so as to form said front hinge pillar wherein said central body and said front extension have different mechanical characteristics.

11. The method according to claim 10 wherein said arcuate shape of said front extension defines a circular arc, and wherein an angle $\alpha$ at a center intercepting said circular arc is greater than or equal to 45°.

12. The method according to claim 5, wherein, when the central body of said front hinge pillar has a mechanical strength that is greater than the mechanical strength exhibited by its front extension, the central body has a mechanical strength Rm of at least 1200 MPa and the front extension has a mechanical strength Rm of between 300 and 1150 Mpa, the mechanical strength being measured according to ISO standard 6892-1:2016.

13. The method according to claim 7 wherein said assembly is part of a vehicle.

14. The method according to claim 1 wherein the differential quenching operation comprises, during the stamping step, an additional step of heating a portion of the stamped blank in at least one of said zones, so that at the time of the hardening step of said at least one zone of the stamping tool is brought to a temperature higher than the temperature exhibited by another zone of said tool.

* * * * *